Patented July 27, 1948

2,445,838

UNITED STATES PATENT OFFICE 2,445,838

TREATMENT OF WASTE SULFITE LIQUOR

Karl Henning Albert Melander, Goteborg, and Göte Emanuel Sävö and Tage Ingemar Johanson, Gota, Sweden, assignors to Sulfit Aktiebolaget Gota, Gota, Sweden No Drawing. Application December 18, 1944, Serial No. 568,786. In Sweden December 29, 1943

6 Claims. (Cl. 260—124)

1

In the manufacture of paper pulp from wood according to the sulphite process it is customary to treat the wood with a solution of calcium bisulphite having a surplus of sulphurous acid. In addition to the unsolved main product derived, i. e. the cellulose, there is obtained a solution which is the so-called waste sulphite liquor. In addition to fermentable and non-fermentable carbohydrates this solution contains as an essential constituent the calcium salt of the lignin sulphonic acid.

Some sulphite cellulose factories produce ethyl alcohol from the above mentioned carbohydrates, the alcohol being then distilled off from the fermented sulphite waste liquor. From the residue or "wash" there are generally at present no other valuable products derived and the factories are often content therewith that the residue is concentrated by vaporization and the remainder then obtained used as fuel, road improvement means, et cetera.

For a long time it has been considered desirable to produce useful washing substances and tanning means from the waste sulphite liquor. As the calcium in the sulphite liquor is detrimental in washing and tanning, a first condition is said fields of application is thus that calcium is exchanged by some other suitable metal, such as sodium, and for this purpose different methods are worked out of which particularly the "lime process" and the "soda process" are well known.

In the lime process there is added to the acid waste sulphite liquor so much milk of lime that the free acid and the bisulphite are neutralized whereupon calcium sulphite is precipitated and filtered off. Then the calcium, still remaining in solution, is removed by means of soda which is added in such a quantity that the exponent pH of hydrogen ion concentration reaches a value of 9. Hereby calcium carbonate is precipitated and may be filtered off and the filtrate, which now contains sodium lignin sulphonate, is adjusted by means of hydrochloric acid to a pH value of 6 and evaporated.

According to the soda process the waste sulphite liquor is neutralized and so much soda is added thereto that the greater portion of the calcium content is precipitated as carbonate. After filtering off the precipitate the calcium remainder is precipitated by sulphuric acid whereupon the solution is evaporated.

Both methods require an expensive evaporation as the entire water mass in the original waste sulphite liquor has to be removed to obtain a dry powder as a final product.

2

In the U. S. Patents 1,699,845 and 1,856,558 to Howard it has been further proposed to subject the waste sulphite liquor to a progressive precipitation with lime the following three main constituents being then separated in stages.

1. A first precipitation (up to a pH value of 10.5) mainly consisting of calcium sulphite.
2. A second precipitation (up to a pH value of 12) mainly consisting of basic calcium lignin sulphonate.
3. A residue lye containing carbohydrates.

The precipitation of calcium lignin sulphonate obtained in stage 2 is sucked off on filter to a dry content of 30 percent and, if desired, pressed to a dry content of 50 percent and may then serve as raw material in the production of different lignin products.

Through Howard's process there is thus obtained the calcium salt of the lignin sulphonic acid without an expensive evaporation.

The present invention has for its object to produce an alkali salt of the lignin sulphonic acid from the precipitated calcium lignin sulphonate in such a manner that the alkali salt obtained is practically completely free from calcium. In connection with the present application the expression "alkali" is understood to comprise sodium and/or potassium and/or ammonium.

A further object of the invention is to cause the conversion of the calcium salt of the lignin sulphonic acid into the corresponding alkali salt in a single step so as to simplify the manufacture thereof. For this purpose only a single reagent mixture will be required according to the present invention.

With such and other objects in view the invention consists essentially therein that the precipitated calcium lignin sulphonate in the presence of water is mixed with an alkali sulphate, i. e. the sulphate of sodium, potassium and/or ammonium, and an acid in such a quantity that the solution of alkali lignin sulphonate obtained will have an acid reaction which solution is filtered or decanted off from insoluble matter and, if desired, concentrated by evaporation.

The procedure according to the invention may be as follows. While stirring, there is added slaked lime to the waste sulphite liquor until a pH value of 8.8 to 9 is reached at a temperature of about 80 degrees centigrade. A precipitation is obtained which consists mainly of calcium sulphite and calcium sulphate and a small quantity of organic substances. After removing the precipitation by filtering or decanting further slaked lime is added to the solution so that this will have a pH value of 11.5 to 12.0. The greater portion of the calcium lignin sulphonate is now precipitated and sucked or decanted off so as to form a mass, mixed with comparatively much water. To this mixture there is added a precalculated quantity of non-aqueous sodium sulphate whereupon sulphurous acid is introduced so that the solution obtained will have a pH value of about 2 to 4. Then the calcium salt of the lignin sulphonic acid will be converted into the corresponding sodium salt which will appear in dissolved form whereas gypsum and calcium sulphite are precipitated. The reaction is completed by heating to 100 degrees centigrade. The precipitate is removed from the solution by filtering or decanting and the solution is cautiously evaporated so that a light coloured dry substance is obtained.

Below a special example will be cited whereby the process is rendered clear. In this example the precipitation of the calcium lignin sulphonate occurs in a single step.

*Example*

As raw material there served 100 liters of waste sulphite liquor having a specific gravity of 1.04, a dry content of 11 percent, a content of calcium of 0.75 percent and a pH value of 5.2. A quantity of 4 kilograms of technical calcined lime or quicklime was slaked by water whereupon, while stirring forcefully, the slaked lime was added to the waste liquor stored in an oak barrel under a temperature of 80 degrees centigrade. After 48 hours the reaction was considered as completed and the pH value of the solution was then 11.5 to 12.0. At the bottom of the barrel there was formed a first granular layer, consisting of non-converted lime, sulphite et cetera, and thereon a second layer of calcium lignin sulphonate. The latter layer was separated off and 23.5 kilograms of the mixture was obtained, containing 3.5 kilograms of calcium lignin sulphonate, as reduced to dry condition, and 20 kilograms water. This mixture was transferred to another oak barrel and .7 kilogram dry sodium sulphate was added thereto whereupon sulphurous acid was introduced, while maintaining the temperature below 20 degrees centigrade, until the solution had a pH value of about 2. After 24 hours the clear liquid was decanted off from precipitated gypsum and calcium sulphate and the solution, which now contained mostly sodium lignin sulphonate, was evaporated in an oak barrel to the consistency of syrup, said barrel having a heating coil through which steam of 100 degrees centigrade was passed. It was particularly observed that the solution all the time had a comparatively rich surplus of sulphurous acid. It was found that this acid had a protective action during the evaporization and contributed to the fact that the final product was of light colour and easily soluble.

The thick solution thus obtained was spread out on large wood plates and allowed to dry while subjected to circulating air of a temperature of about 30 degrees centigrade. As a final product 2.8 kilograms of sodium lignin sulphonate, counted as dry weight, was obtained. An analysis thereof showed the following items

| | Per cent |
|---|---|
| Ashes | 17 |
| Calcium | 0.3 |
| Sodium | 7.0 |

We claim:

1. In the process of recovering an alkali lignin sulfonate from sulfite waste liquor wherein the latter is treated with lime to produce a precipitate of calcium lignin sulfonate and the latter is then separated from the liquor; the improvement which comprises adding an alkali metal sulfate to said precipitate of calcium lignin sulfonate in the presence of water to convert the calcium lignin sulfonate to the corresponding alkali metal lignin sulfonate, acidifying the mixture with sulfurous acid to produce a precipitate of calcium sulfate and separating the latter from the resulting solution of alkali metal lignin sulfonate.

2. The process of claim 1 wherein the alkali metal sulfate is sodium sulfate and wherein this is added to the calcium lignin sulfonate in the ratio of about 1 part to 5 parts by weight of the calcium lignin sulfonate.

3. The process of claim 1 wherein the mixture is acidified by the addition of sulfurous acid to produce a pH of about 2 to 4.

4. The process of claim 1 wherein the solution of alkali metal lignin sulfonate is evaporated to dryness in the presence of sulfurous acid.

5. In the process of recovering sodium lignin sulfonate in dry form from sulfite waste liquor wherein the latter is treated with lime to produce a pH within the range of about 11.5 to 12 thereby causing the precipitation of calcium lignin sulfonate and the latter is separated from the liquor; the improvement which comprises adding sodium sulfate to said calcium lignin sulfonate in the presence of water to convert the calcium lignin sulfonate to sodium lignin sulfonate, acidifying with sulfurous acid, whereby calcium sulfate is precipitated, and separating the latter from the resulting solution of sodium lignin sulfonate.

6. The process of recovering sodium lignin sulfonate in dry form from sulfite waste liquor wherein the latter is treated with lime to produce a pH within the range of about 11.5 to 12 thereby causing the precipitation of calcium lignin sulfonate and the latter is separated from the liquor; the improvement which comprises adding sodium sulfate to said calcium lignin sulfonate in the presence of water in the ratio of about 1 part of sodium sulfate to 5 parts by weight of calcium lignin sulfonate, acidifying with sulfurous acid to a pH of about 2 to 4, whereby calcium sulfate is precipitated, separating the latter and evaporating to dryness the resulting solution of sodium lignin sulfonate.

KARL HENNING ALBERT MELANDER.
GÖTE EMANUEL SÄVÖ.
TAGE INGEMAR JOHANSON.

REFERENCES CITED

The following references are of record in the file of this patent:

UNITED STATES PATENTS

| Number | Name | Date |
|---|---|---|
| 1,080,970 | Honig | Dec. 9, 1913 |
| 1,147,245 | Hurt | July 20, 1915 |
| Re. 18,268 | Howard | Dec. 1, 1931 |
| 2,057,117 | Sandborn et al. | Oct. 13, 1936 |
| 2,201,812 | Daniel | May 21, 1940 |

FOREIGN PATENTS

| Number | Country | Date |
|---|---|---|
| 313,150 | Germany | July 4, 1919 |